United States Patent
Saito et al.

(10) Patent No.: US 9,618,906 B2
(45) Date of Patent: Apr. 11, 2017

(54) HAND-MOVING MECHANISM AND TIMEPIECE

(71) Applicant: CASIO COMPUTER CO., LTD., Shibuya-ku, Tokyo (JP)

(72) Inventors: Yuta Saito, Kokubunji (JP); Junro Yano, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/974,667

(22) Filed: Dec. 18, 2015

(65) Prior Publication Data

US 2016/0202666 A1    Jul. 14, 2016

(30) Foreign Application Priority Data

Jan. 14, 2015 (JP) ................. 2015-004643

(51) Int. Cl.
*G04C 3/14* (2006.01)
*G04B 19/04* (2006.01)

(52) U.S. Cl.
CPC ............... *G04C 3/14* (2013.01); *G04B 19/04* (2013.01); *G04C 3/146* (2013.01)

(58) Field of Classification Search
CPC ........... G04C 3/14; G04C 3/146; G04B 19/04
USPC ......................................... 318/696; 310/112
See application file for complete search history.

(56) References Cited

U.S. PATENT DOCUMENTS

| | | | | |
|---|---|---|---|---|
| 4,782,353 A * | 11/1988 | Ogihara | ................... | G03B 9/08 310/112 |
| 4,958,099 A * | 9/1990 | Chigira | ................... | H02K 21/14 310/112 |
| 5,117,137 A * | 5/1992 | Kobayashi | ............... | G02B 7/08 310/49.23 |
| 5,119,349 A * | 6/1992 | Muto | ..................... | G04C 17/00 368/107 |
| 7,385,320 B2 * | 6/2008 | Kawamoto | ............. | H02K 1/14 310/40 MM |
| 2006/0126436 A1 | 6/2006 | Watanabe et al. | | |
| 2014/0111037 A1 * | 4/2014 | Funakoshi | ............. | H02K 3/522 310/43 |

FOREIGN PATENT DOCUMENTS

JP          2006170764 A      6/2006

\* cited by examiner

*Primary Examiner* — Sean Kayes
(74) *Attorney, Agent, or Firm* — Holtz, Holtz & Volek PC

(57) ABSTRACT

A hand-moving mechanism moves a hand and includes a stepping motor and a wheel train mechanism. The stepping motor includes a plurality of coils and rotates a rotational shaft thereof in forward and reverse directions. The wheel train mechanism includes a plurality of gears having: one gear which is coupled to the rotational shaft of the stepping motor; and another gear which is coupled to the hand. The stepping motor includes two coil cores which are arranged in a vicinity of a peripheral edge portion in a module having a bent peripheral edge portion, which have a linear shape respectively and which extend from a central coupling portion respectively. Each of the two coil cores is formed to be bent at a predetermined angle following a bent shape of the peripheral edge portion of the module, so as to sandwich the central coupling portion between the two coil cores.

8 Claims, 9 Drawing Sheets

HAND-MOVING MECHANISM AND TIMEPIECE

CROSS-REFERENCE TO RELATED APPLICATION

This application is based upon and claims the benefit of priority from the prior Japanese Patent Application No. 2015-004643, filed on Jan. 14, 2015, and the entire contents of which are incorporated herein by reference.

BACKGROUND OF THE INVENTION

1. Field of the Invention

The disclosure relates to a hand-moving mechanism and a timepiece having the same.

2. Description of the Related Art

In the related art, a retrograde mechanism that is to be used for a hand-moving mechanism of a timepiece and is configured to display predetermined information by reciprocally moving a hand in a fan shape has been known. As the retrograde mechanism, a mechanical type using cams, a spring and the like is generally used (for example, refer to JP-A-2006-170764). The mechanical retrograde mechanism is configured to sequentially move the hand from a base point by each scale by using the cams and then to rapidly swing the hand back to the base point by the sprint upon arrival of the hand at a scale end.

However, since the plurality of cams, the spring and the like are combined in the mechanical retrograde mechanism, a structure of the mechanism is very complex.

Regarding this, if the mechanical structure is simply replaced with a stepping motor of a single core, it is difficult to largely change torque that is to be applied to the hand. For this reason, it is not easy to rapidly swing the hand having arrived at the scale end back to the base point or to release the hand restrained due to the external shock and the like by applying the strong torque, so that it is difficult to favorably move the hand.

SUMMARY OF THE INVENTION

It is therefore an object of the disclosure to provide a hand-moving mechanism having a simple structure and capable of favorably moving a hand and a timepiece having the same.

According to the disclosure, a hand-moving mechanism capable of favorably moving a hand and a timepiece having the same are provided.

A hand-moving mechanism of the present invention, which is configured to move a hand, includes a stepping motor and a wheel train mechanism. The stepping motor includes a plurality of coils and rotates a rotational shaft thereof in forward and reverse directions. The wheel train mechanism includes a plurality of gears. The gears include one gear which is coupled to the rotational shaft of the stepping motor and another gear which is coupled to the hand. The stepping motor includes two coil cores. The two coil cores are arranged in a vicinity of a peripheral edge portion in a module having a bent peripheral edge portion, have a linear shape respectively and extend from a central coupling portion respectively. Each of the two coil cores is formed to be bent at a predetermined angle following a bent shape of the peripheral edge portion of the module, so as to sandwich the central coupling portion between the two coil cores.

DESCRIPTION OF THE PREFERRED EMBODIMENT

An illustrative embodiment of the hand-moving mechanism of the disclosure will be described with reference to FIGS. 1 to 9A to 9C.

Meanwhile, in this illustrative embodiment to be described later, a variety of definitions that are technically preferable for implementation of the disclosure are made. However, the scope of the disclosure is not limited to the illustrative embodiment and the shown examples.

Figure 1:
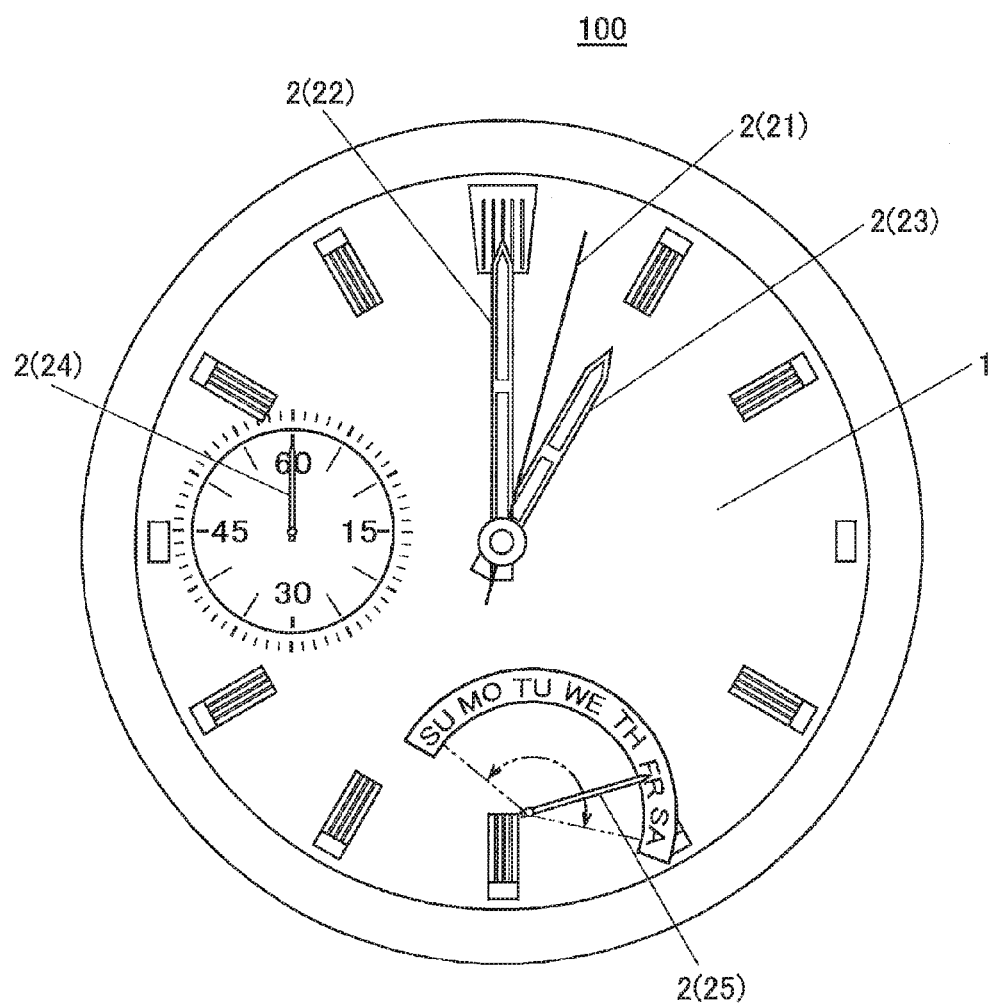
FIG. 1 is a plan view of a timepiece according to an illustrative embodiment.

FIG. 1 is a plan view of a timepiece 100 according to the illustrative embodiment.

As shown in FIG. 1, the timepiece 100 according to the illustrative embodiment is an analog-type timepiece having a dial plate 1 and a plurality of hands 2 and configured to display time and the like by moving the plurality of hands 2 on the circular dial plate 1.

The plurality of hands 2 includes a second hand 21, a minute hand 22 and a hour hand 23, which are configured to rotate around a substantially central portion of the dial plate 1 and to display time, and two small hands 24, 25 configured to rotate in separate small areas on the dial plate 1 and to display a variety of information.

The small hand 24 of the two small hands 24, 25 is configured to rotate in one direction, like the second hand 21, the minute hand 22 and the hour hand 23, and is used for a chronograph function, for example. On the other hand, the small hand 25 is a retrograde hand configured to reciprocally rotate within a fan-shaped range of a predetermined angle and to display predetermined information (a day, in this illustrative embodiment).

The timepiece 100 has a module 3 on a backside of the dial plate 1.

Figure 2:
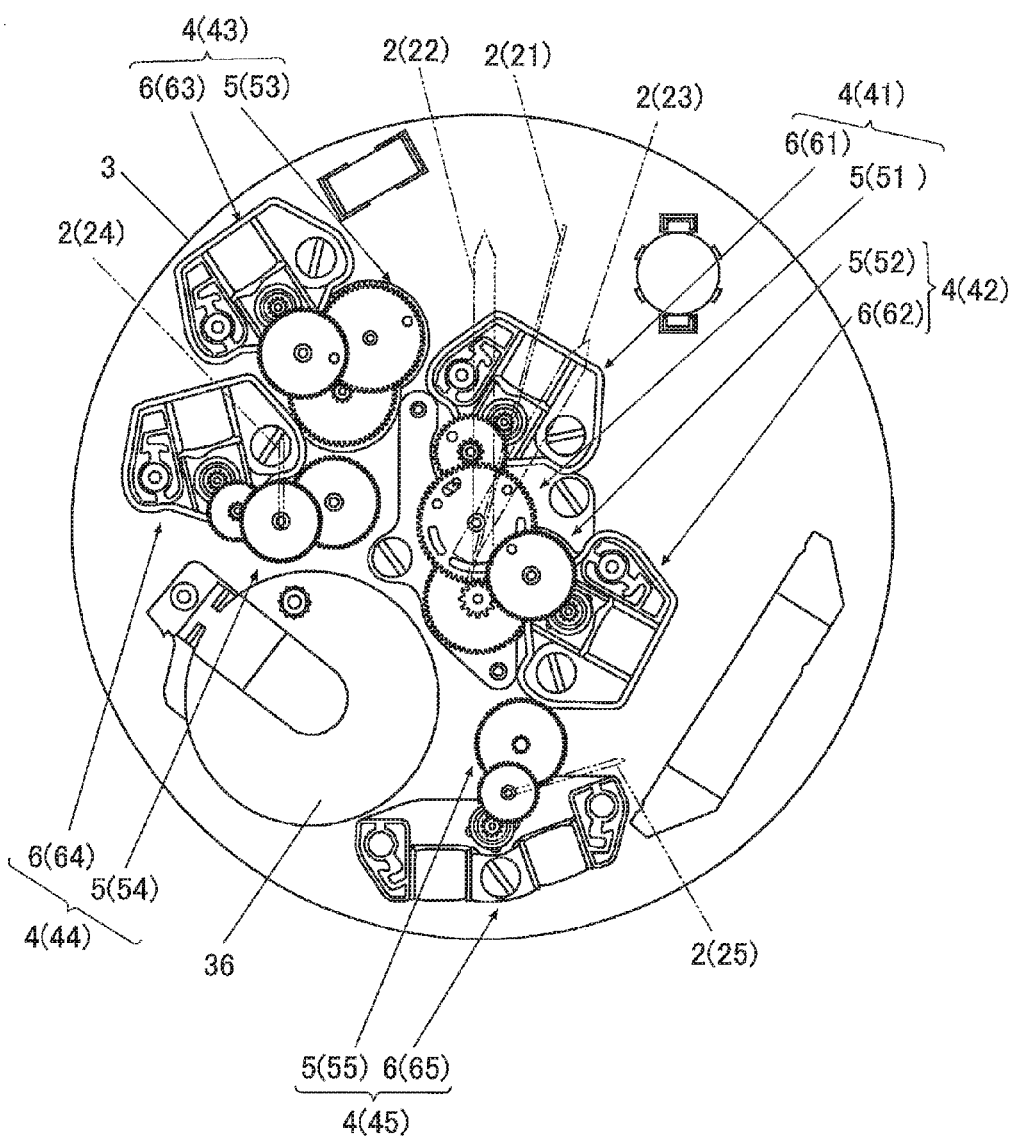
FIG. 2 is a plan view depicting an internal configuration of a module in this illustrative embodiment.

FIG. 2 is a plan view depicting an internal configuration of the module 3.

As shown in FIG. 2, the module 3 has a substantially circular shape corresponding to the dial plate 1 in a plan view, and is configured to accommodate therein a battery 36, which is a power supply unit of the timepiece 100, a circuit substrate 37 (refer to FIG. 3) having a control circuit mounted thereon, a plurality of hand-moving mechanisms 4 configured to move the plurality of hands 2, and the like.

The plurality of hand-moving mechanisms 4 corresponds to the plurality of hands 2 and is configured to individually move the corresponding hands 2.

Among the plurality of hand-moving mechanisms 4, since the hand-moving mechanisms 41 to 43 corresponding to the second hand 21, the minute hand 22 and the hour hand 23 are configured to move the second hand 21, the minute hand 22 and the hour hand 23 configured to rotate around the central portion of the dial plate 1, the hand-moving mechanisms 41 to 43 are arranged to be close to a central portion in the module 3. However, in this illustrative embodiment, the hand-moving mechanism 43 corresponding to the hour hand 23 is arranged at a position somewhat distant from the central portion because of a layout space in the module 3.

In the meantime, the hand-moving mechanisms 44, 45 corresponding to the two small hands 24, 25 are arranged in the vicinity of a curved peripheral edge portion in the module 3 so as to avoid the hand-moving mechanisms 41 to 43, and the like.

Specifically, the plurality of hand-moving mechanisms 4 has a wheel train mechanism 5 and a stepping motor 6, respectively.

The wheel train mechanism 5 is configured by a plurality of gears meshed with each other. The gear at one end is coupled to a rotational shaft of the stepping motor 6, and the gear at the other end is coupled to the hand 2.

The stepping motor 6 is configured to rotate the hand 2 via the wheel train mechanism 5.

Among the stepping motors 6 of the plurality of hand-moving mechanisms 4, the stepping motors 61 to 64 corresponding to the second hand 21, the minute hand 22, the hour hand 23 and the small hand 24 have only one coil core, respectively. Since the stepping motors 61 to 64 have a general structure, the detailed descriptions thereof are omitted.

On the other hand, the stepping motor 65 corresponding to the small hand 25 is a dual core motor having two coil cores 86a, 86b, which will be described later, and is configured to rotate a rotational shaft thereof (a rotor 7, which will be described later) in both forward and reverse directions. In the meantime, the stepping motor 65, the wheel train mechanism 55 and the small hand 25 configure a retrograde mechanism configured to reciprocally move the small hand 25, which is a retrograde hand, within a predetermined angle range of rotation.

Figure 3:
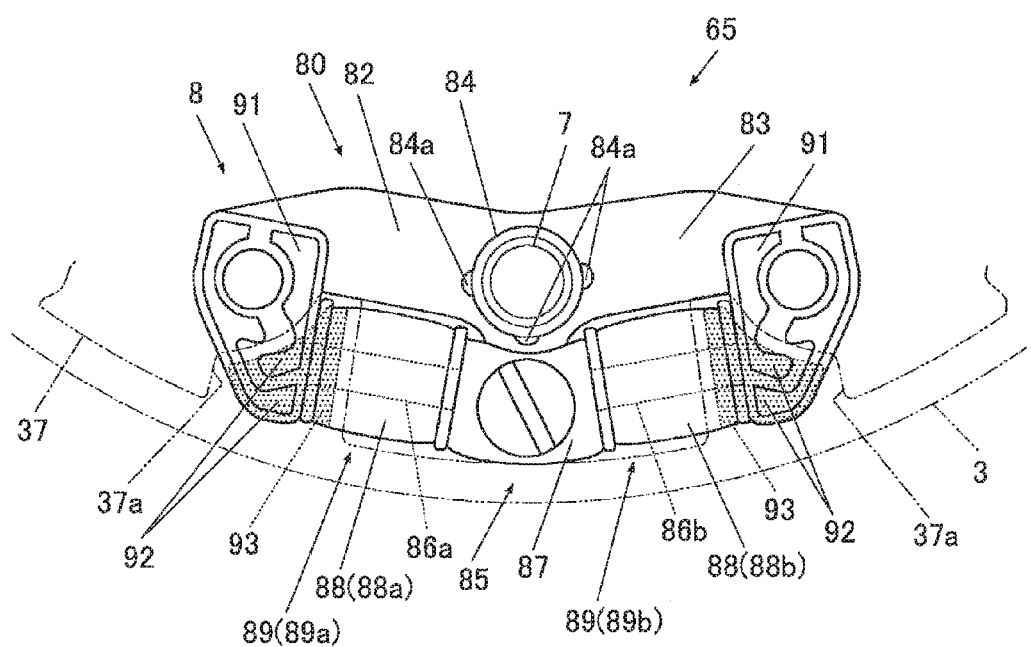
FIG. 3 is a plan view of a stepping motor in this illustrative embodiment.

FIG. 3 is a plan view of the stepping motor 65.

As shown in FIG. 3, the stepping motor 65 has a rotor 7, which is a rotational shaft, and a stator 8 configured to rotate the rotor 7.

The rotor 7 has a diametrically dipolar magnetized magnet attached to a rotational support shaft (not shown). In this illustrative embodiment, the magnet has a disc shape, and the rotational support shaft is attached to a center of a circle of the magnet.

As the magnet configuring the rotor 7, a permanent magnet such as a rare earth magnet (for example, a samarium cobalt magnet and the like) is preferably used. However, the type of the magnet configuring the rotor 7 is not limited thereto.

The rotor 7 is accommodated in a rotor accommodation part 84 of a stator main body 80, which will be described later, and is arranged to be rotatable about the rotational support shaft, which is a center of rotation.

The rotor 7 is coupled with a predetermined gear of the wheel train mechanism 55 (refer to FIG. 2), and the rotor 7 is rotated to rotate the gear.

The stator 8 is configured by a stator main body 80 and a coil support part 85.

Figure 4A:
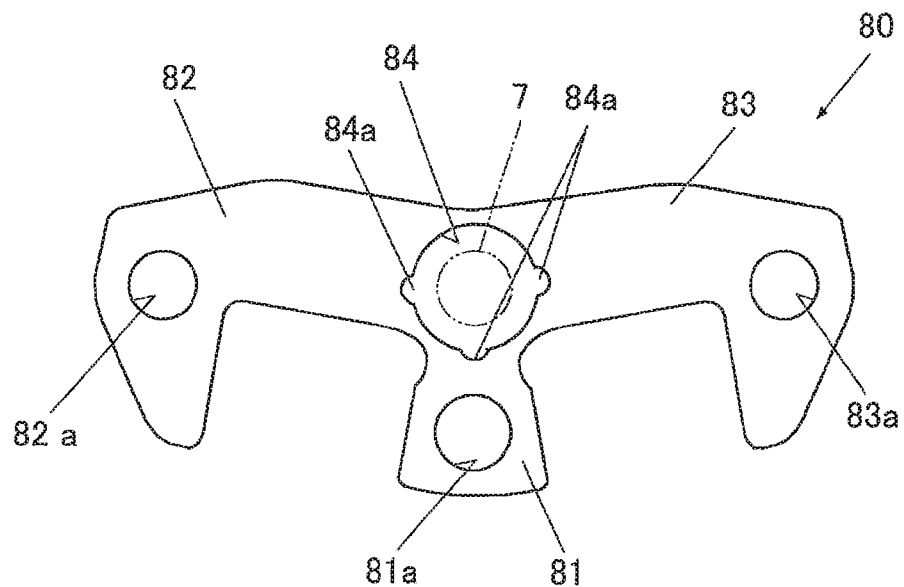
FIG. 4A is a plan view of a stator main body of the stepping motor in this illustrative embodiment.
Figure 4B:
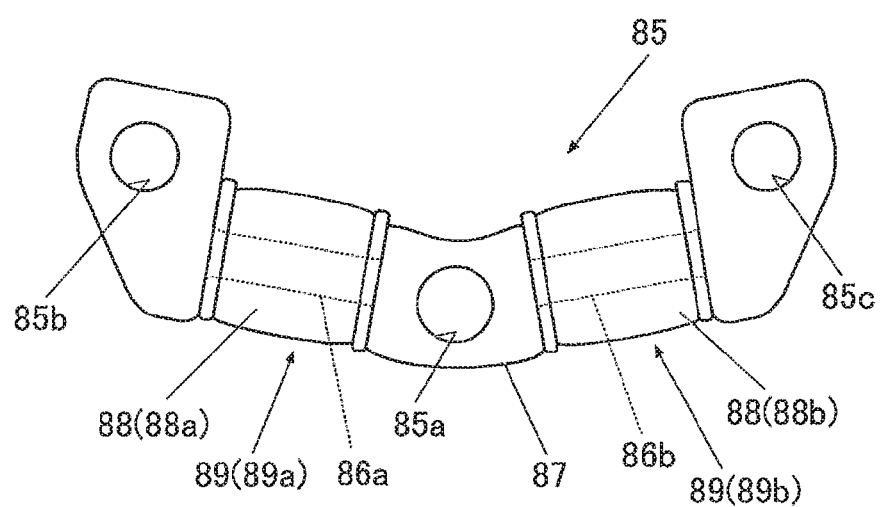
FIG. 4B is a plan view of a coil support part.

FIG. 4A is a plan view of the stator main body 80, and FIG. 4B is a plan view of the coil support part 85.

As shown in FIG. 4A, the stator main body 80 is formed of a high permeability material such as permalloy, and has a first yoke 81, a second yoke 82 and a third yoke 83. Also, an intersection point of the first yoke 81, the second yoke 82 and the third yoke 83 is formed with a rotor accommodation part 84, which is a hole portion having a substantially circular shape. In the rotor accommodation part 84, the rotor 7 is arranged to be rotatable.

Also, each of the second yoke 82 and the third yoke 83 is somewhat bent so as to sandwich the rotor accommodation part 84 between the second yoke 82 and the third yoke 83 so that an angle therebetween at an opposite side to the first yoke 81 is less than 180°.

An inner periphery of the rotor accommodation part 84 is provided with three recess portions 84a. The three recess portions 84a are a stator-side stationary portion for keeping a stationary state of the rotor 7, and are provided to magnetically stabilize and stop the rotor 7 at a predetermined position at a non-energization state of the stepping motor 65.

The first yoke 81, the second yoke 82 and the third yoke 83 are respectively provided at free ends thereof with coupling holes 81a, 82a, 83a for coupling the stator main body 80 to the coil support part 85.

As shown in FIG. 4B, the coil support part 85 is formed of a high permeability material such as permalloy, and has a shape where two coil cores 86a, 86b are coupled with a central coupling portion 87.

The two coil cores 86a, 86b are configured to carry coils 88 (a first coil 88a and a second coil 88b) wound onto the coil cores 86a, 86b. In this way, the coils 88 are respectively carried on the two coil cores 86a, 86b, so that two coil blocks 89 (a first coil block 89a and a second coil block 89b) are configured. Meanwhile, in this illustrative embodiment, the two coil cores 86a, 86b have substantially the same length, and amounts of the coils 88 to be wound (the number of turns) are also substantially the same.

Also, the two coil cores 86a, 86b are substantially linear but are bent with each other at a predetermined angle about the coupling portion 87 so as to follow a curved shape of the peripheral edge portion of the module 3 (refer to FIG. 3). That is each of the two coil cores 86a, 86b is formed to be bent at a predetermined angle following a bent shape of the peripheral edge portion of the module 3 so as to sandwich the coupling portion 87 between the two coil cores 86a, 86b.

The coupling portion 87 of the coil support part 85 and both ends thereof are provided with three coupling holes 85a to 85c for coupling the coil support part 85 to the stator main body 80. The three coupling holes 85a to 85c are screw-fastened to the coupling holes 81a, 82a, 83a of the stator main body 80, respectively, so that the stator main body 80 and the coil support part 85 are magnetically connected.

As shown in FIG. 3, the two coil blocks 89 of the coil support part 85 are arranged to magnetically connect the first yoke 81, the second yoke 82 and the third yoke 83 of the stator main body 80 at a state where the stator main body 80 and the coil support part 85 are fixed.

Specifically, the first coil block 89a is arranged to magnetically connect the first yoke 81 and the second yoke 82, and the second coil block 89b is arranged to magnetically connect the first yoke 81 and the third yoke 83.

Both ends of the coil support part 85 are provided with two coil substrates 91. Each coil substrate 91 is mounted with two coil terminals 92, and the two coil terminals 92 are connected with both ends of the coils 88 positioned at sides close to the coil substrates 91.

Peripheries of the two coil terminals 92 of each coil substrate 91 are covered with a protective resin 93 for preventing breaking of the coil, together with an end portion of the connected coil 88. For this reason, a covering portion of the protective resin 93 is convex to be higher than a surface of the coil substrate 91.

Also, the two coil substrates 91 are electrically connected to the circuit substrate 37 arranged above the two coil substrates.

The circuit substrate 37 is formed with two notches 37a for avoiding the two protective resins 93 more convex than the surfaces of the coil substrates 91 so that the notches open towards an outer periphery of the module 3. For this reason, the circuit substrate 37 is securely surface-contacted to the two coil substrates 91 while avoiding overlaps with the two protective resins 93.

Figure 5:
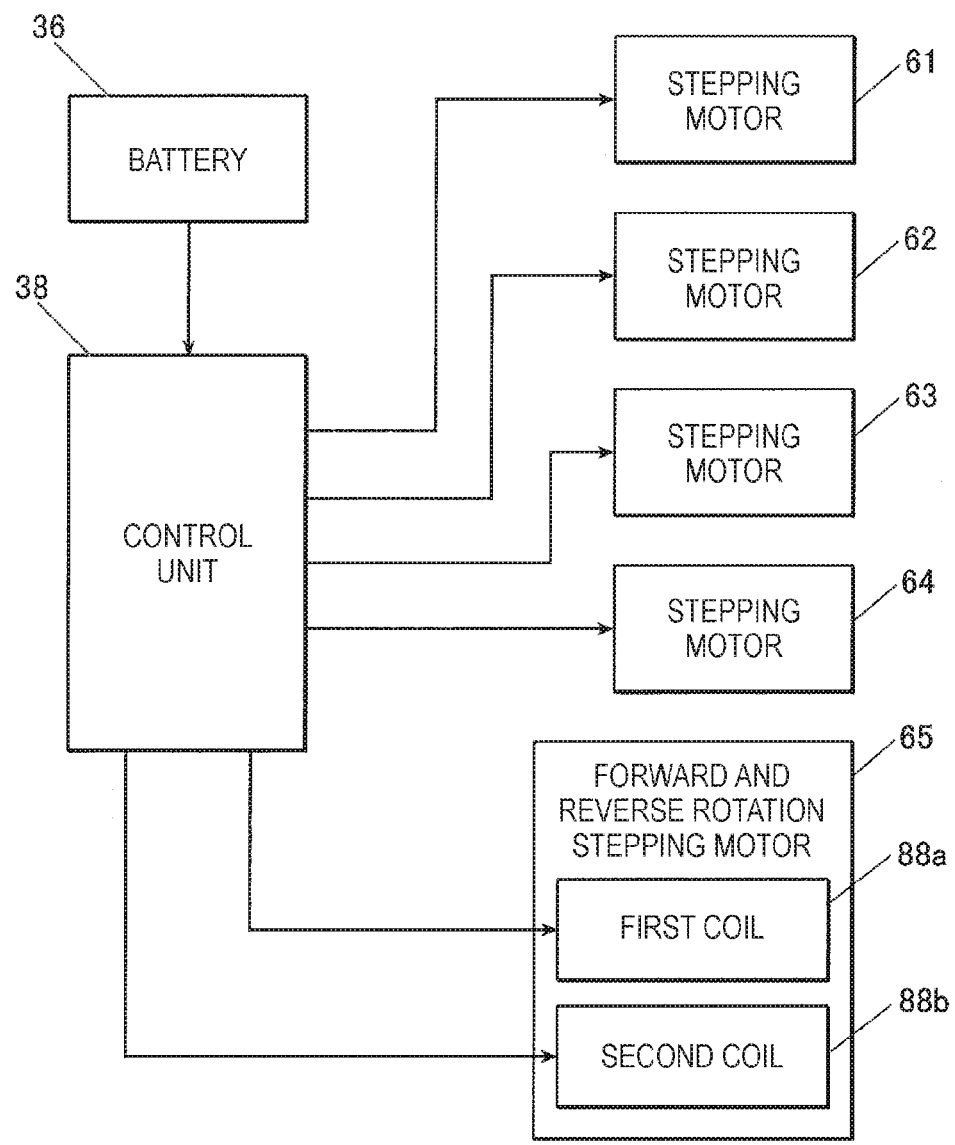
FIG. 5 is a block diagram depicting a schematic control configuration of the timepiece according to an illustrative embodiment.

FIG. 5 is a block diagram depicting a schematic control configuration of the timepiece 100.

As shown in FIG. 5, the timepiece 100 has a control unit 38 (a motor driving control unit). The control unit 38 is configured by a CPU (Central Processing Unit) and the like mounted on the circuit substrate 37, and is configured to collectively control respective units of the timepiece 100.

Specifically, the control unit 38 is configured to apply driving pulses to the stepping motors 6 of the plurality of hand-moving mechanisms 4 by using the battery 36 as a power supply unit, thereby controlling the driving of the stepping motors 6 and the rotation driving of the hands 2.

In particular, the control unit 38 is configured to control rotation of the rotor 7 of the stepping motor 65 and the small hand 25 (the retrograde hand) with a predetermined step angle in any direction of a forward rotation direction (a clockwise direction) and a reverse direction (a counterclockwise direction) by individually controlling energization (applying of the driving pulse) to the two coils 88 of the stepping motor 65, which is a dual core motor.

Subsequently, an operating aspect of the retrograde mechanism of the timepiece 100 is described.

First, a display hand-moving operation of rotating the small hand 25 (the retrograde hand) in the forward rotation direction (the clockwise direction) to display predetermined information (day, in this illustrative embodiment) with the small hand 25 is described with reference to FIGS. 6A to 6C and 7A to 7C.

FIGS. 6A to 6C and 7A to 7C illustrate flows of a magnetic flux when rotating the rotor 7 of the stepping motor 65 in the forward direction in a case where the number of coils to be energized at the same time is one.

In this illustrative embodiment, when no coils 88 are energized, the rotor 7 is stationary at a state where a magnetic pole of the first yoke 81 opposing to an S-pole of the rotor 7 is an N-pole and the two recess portions 84a of the second yoke 82-side and the third yoke 83-side and a polarization position of the magnet of the rotor 7 face each other, for example.

Figure 6A:
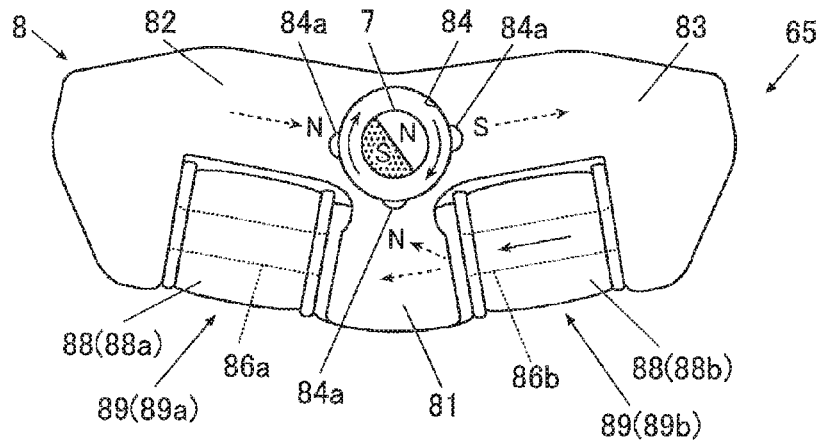
FIGS. 6A to 6C illustrate flows of a magnetic flux when rotating a rotor of the stepping motor in a forward direction.

When rotating the rotor 7 from the state in the forward direction, the control unit 38 first applies a driving pulse of a positive direction only to the second coil 88b. Thereby, as shown in FIG. 6A, a magnetic flux of a direction shown with the solid line is generated in the second coil 88b, the magnetic pole of the first yoke 81 becomes the N-pole and the magnetic pole of the third yoke 83 becomes the S-pole.

Further, the magnetic flux flows to the second yoke 82 through the first yoke 81 and the coil core 86a of the first coil 88a, so that the magnetic pole of the second yoke 82 becomes the N-pole. As a result, the rotor 7 starts to rotate in the forward rotation direction while the N-pole thereof is being attracted to the third yoke 83 of the S-pole.

Figure 6B:
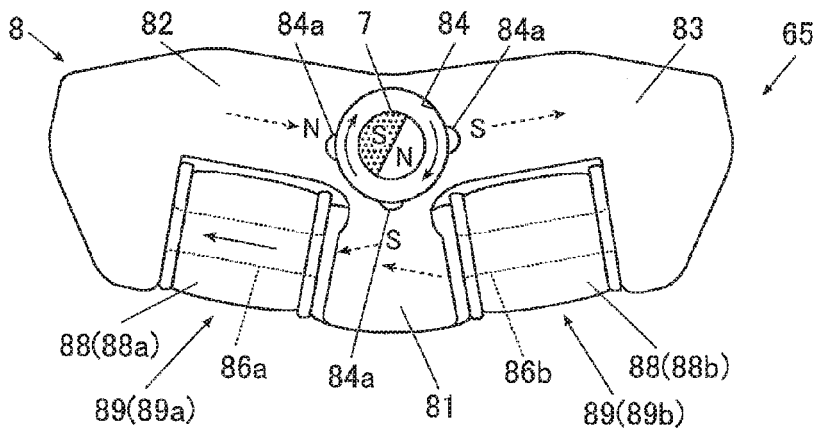

Then, the control unit 38 applies the driving pulse of the positive direction only to the first coil 88a. At this time, the control unit 38 sets an applying time period of the driving pulse to be long (for example, 50% or greater and less than 100% of an entire applying time period upon rotation of the rotor by 180°) so as to largely rotate the rotor 7. Thereby, as shown in FIG. 6B, a magnetic flux of a direction shown with the solid line is generated in the first coil 88a, the magnetic pole of the first yoke 81 becomes the S-pole and the magnetic pole of the second yoke 82 becomes the N-pole. Further, the magnetic flux flows to the third yoke 83 through the first yoke 81 and the coil core 86b of the second coil 88b, so that the magnetic pole of the third yoke 83 becomes the S-pole. As a result, the rotor 7 further rotates in the forward rotation direction while the S-pole thereof is being attracted to the second yoke 82 of the N-pole.

Figure 6C:
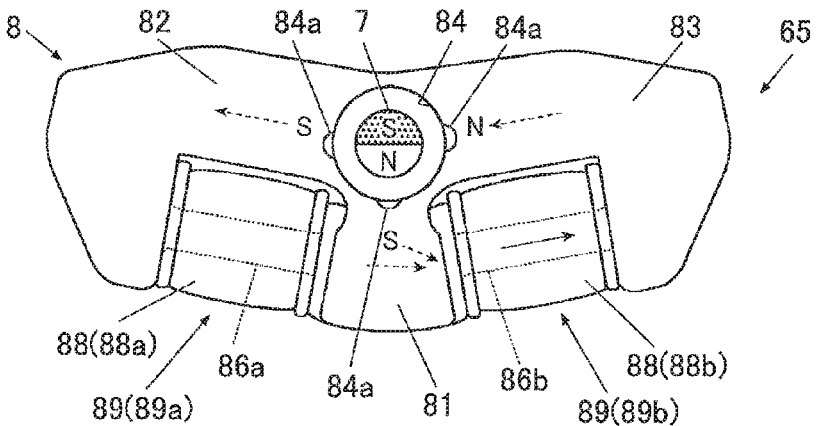

Then, the control unit 38 applies a driving pulse of a negative direction only to the second coil 88b. Thereby, as shown in FIG. 6C, a magnetic flux of a direction shown with the solid line is generated in the second coil 88b, the magnetic pole of the first yoke 81 becomes the S-pole and the magnetic pole of the third yoke 83 becomes the N-pole. Further, the magnetic flux flows to the second yoke 82 through the first yoke 81 and the coil core 86a of the first coil 88a, so that the magnetic pole of the second yoke 82 becomes the S-pole. As a result, the rotor 7 rotates in the forward rotation direction while the N-pole thereof is being repulsive to the third yoke 83 of the N-pole, and is stationary at a magnetically stable position at which the two recess portions 84a of the second yoke 82-side and the third yoke 83-side and the polarization position of the magnet of the rotor 7 face each other, i.e., at a position rotated from the rotation start position by 180° (hereinafter, referred to as 'half rotation position').

As the rotor 7 of the stepping motor 65 is rotated from the rotation start position by 180°, the small hand 25 is rotated forward by a predetermined step angle by the wheel train mechanism 55 configured to couple the rotor 7 and the small hand 25 in a predetermined gear ratio. Thereby, in this illustrative embodiment, a day indicated by the small hand 25 is changed to a next day (refer to FIG. 1).

Figure 7A:
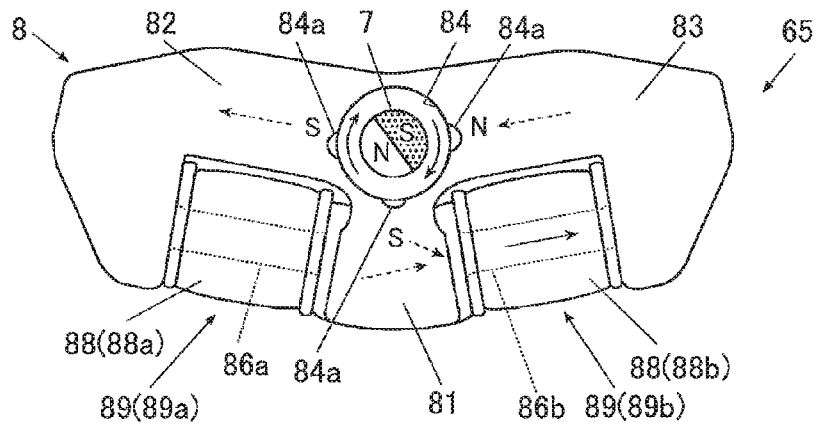
FIGS. 7A to 7C illustrate flows of the magnetic flux when rotating the rotor of the stepping motor in the forward direction.

When further rotating the rotor 7 from the half rotation position in the forward direction by 180° to return the same to the rotation start position, the control unit 38 applies the driving pulse of the negative direction only to the second coil 88b. Thereby, as shown in FIG. 7A, a magnetic flux of a direction shown with the solid line is generated in the second coil 88b, the magnetic pole of the first yoke 81 becomes the S-pole and the magnetic pole of the third yoke 83 becomes the N-pole. Further, the magnetic flux flows to the second yoke 82 through the first yoke 81 and the coil core 86a of the first coil 88a, so that the magnetic pole of the second yoke 82 becomes the S-pole. As a result, the rotor 7 rotates in the forward rotation direction while the S-pole thereof is being attracted to the magnetic pole of the third yoke 83 of the N-pole.

Figure 7B:
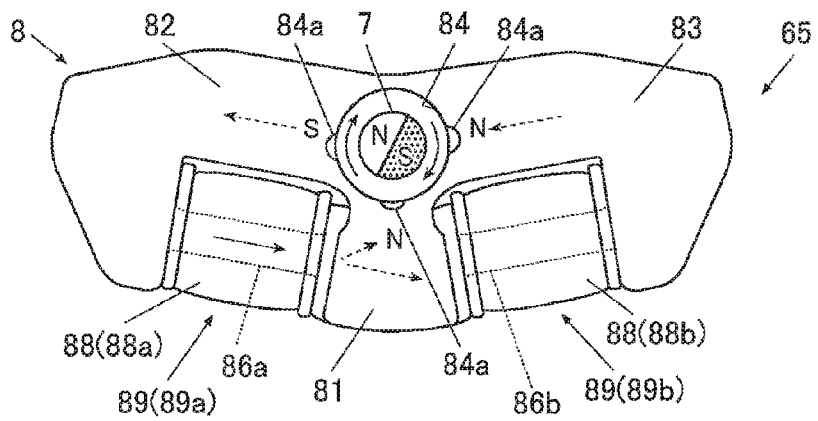

Then, the control unit 38 applies the driving pulse of the positive direction only to the first coil 88a. At this time, the control unit 38 sets an applying time period of the driving pulse to be long (for example, 50% or greater and less than 100% of the entire applying time period upon rotation of the rotor by 180°) so as to largely rotate the rotor 7. Thereby, as shown in FIG. 7B, a magnetic flux of a direction shown with the solid line is generated in the first coil 88a, the magnetic pole of the first yoke 81 becomes the N-pole and the magnetic pole of the second yoke 82 becomes the S-pole. Further, the magnetic flux flows to the third yoke 83 through the first yoke 81 and the coil core 86b of the second coil 88b, so that the magnetic pole of the third yoke 83 becomes the N-pole. As a result, the rotor 7 further rotates in the forward rotation direction while the N-pole thereof is being attracted to the second yoke 82 of the S-pole.

Figure 7C:
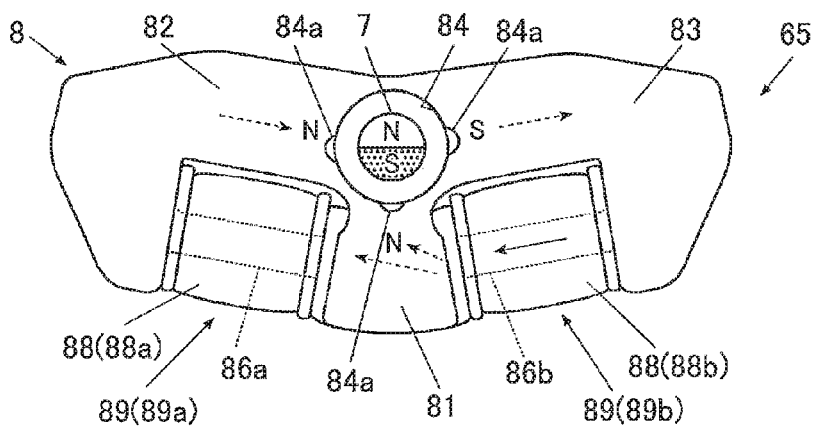

Then, the control unit 38 applies the driving pulse of the positive direction only to the second coil 88b. Thereby, as shown in FIG. 7C, a magnetic flux of a direction shown with the solid line is generated in the second coil 88b, the magnetic pole of the first yoke 81 becomes the N-pole and the magnetic pole of the third yoke 83 becomes the S-pole. Further, the magnetic flux flows to the second yoke 82 through the first yoke 81 and the coil core 86a of the first coil 88a, so that the magnetic pole of the second yoke 82 becomes the N-pole. As a result, the rotor 7 is stationary at the magnetically stable position at which the two recess portions 84a of the second yoke 82-side and the third yoke 83-side and the polarization position of the magnet of the rotor 7 face each other, i.e., at a position further rotated from the half rotation position by 180° while the S-pole thereof is being repulsive to the third yoke 83 of the S-pole.

As the rotor 7 of the stepping motor 65 is rotated from the half rotation position by 180°, the small hand 25 is rotated forward by the predetermined step angle by the wheel train mechanism 55 configured to couple the rotor 7 and the small hand 25 in the predetermined gear ratio. Thereby, in this illustrative embodiment, a day indicated by the small hand 25 is further changed to a next day (refer to FIG. 1).

In this way, according to this illustrative embodiment, during the display hand-moving operation of the small hand 25, only one of the two coils 88 is energized to rotate the small hand 25 (i.e., the rotor 7).

Subsequently, a non-display hand-moving operation of swinging the small hand 25 back to a base point (left end) of the rotation range without displaying the information by energizing both the two coils 88 to rapidly rotate the small hand 25 in the reverse rotation direction (the counterclockwise direction) is described with reference to FIGS. 8A to 8C.

Figure 8A:
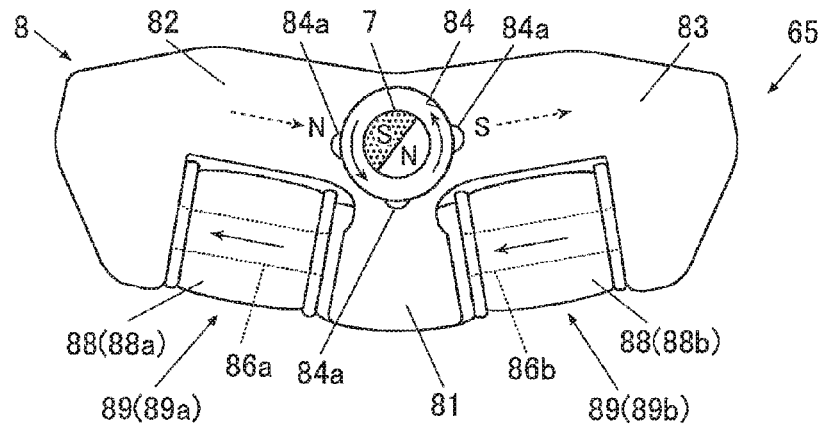
FIGS. 8A to 8C illustrate flows of the magnetic flux when rotating the rotor of the stepping motor in a reverse direction.
Figure 8B:
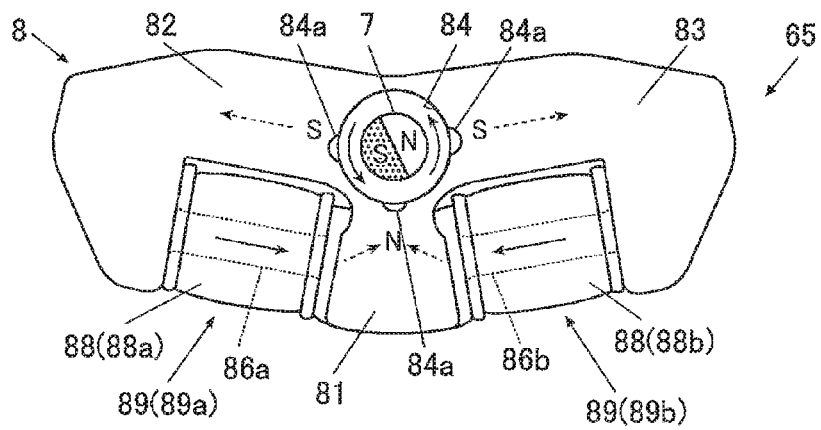
Figure 8C:
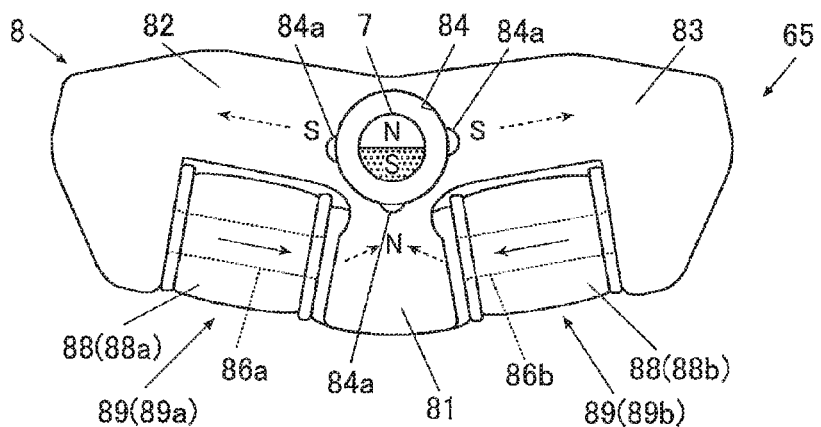

FIGS. 8A to 8C illustrate flows of the magnetic flux when reversing the rotor 7 of the stepping motor 65.

In this illustrative embodiment, when no coils 88 are energized, the rotor 7 is stationary at a state where the magnetic pole of the first yoke 81 opposing to the N-pole of the rotor 7 becomes the S-pole and the two recess portions 84a of the second yoke 82-side and the third yoke 83-side and the polarization position of the magnet of the rotor 7 face each other, for example.

When rapidly reversing the rotor 7 from the state, the control unit 38 first applies the driving pulse of the positive direction to the first coil 88a, and at the same time, applies the driving pulse of the positive direction to the second coil 88b. Thereby, as shown in FIG. 8A, magnetic fluxes shown with the solid lines are generated in the first coil 88a and the second coil 88b, the magnetic pole of the second yoke 82 becomes the N-pole, and the magnetic pole of the third yoke 83 becomes the S-pole. As a result, the rotor 7 starts to rotate in the reverse rotation direction while the S-pole thereof is being attracted to the second yoke 82 of the N-pole.

Then, the control unit 38 applies the driving pulse of the negative direction to the first coil 88a, and at the same time, applies the driving pulse of the positive direction to the second coil 88b. Thereby, as shown in FIG. 8B, magnetic fluxes shown with the solid lines are generated in the first coil 88a and the second coil 88b, the magnetic pole of the first yoke 81 becomes the N-pole, and the magnetic poles of the second yoke 82 and the third yoke 83 become the S-pole. As a result, the rotor 7 further rotates in the reverse rotation direction while the S-pole thereof is being attracted to the first yoke 81 of the N-pole.

Then, as shown in FIG. 8C, the rotor 7 is stationary at the magnetically stable position at which the two recess portions 84a of the second yoke 82-side and the third yoke 83-side and the polarization position of the magnet of the rotor 7 face each other, i.e., at the position further rotated from the half rotation position by 180°.

Thereafter, while the control unit 38 energizes the two coils 88 at the same time, the control unit sequentially changes the magnetic poles of the respective yokes 81 to 83 as the rotor 7 rotates, thereby continuously rotating the rotor 7 in the reverse rotation direction. Then, the control unit 38 rotates the rotor 7 until the small hand 25 reaches the left end of the rotation range, and then stops the rotor 7.

In this way, according to this illustrative embodiment, during the non-display hand-moving operation of the small hand 25, the small hand 25 (i.e., the rotor 7) is rotated by energizing the two coils 88 at the same time. For this reason, it is possible to swing the small hand 25 back in a much shorter time, as compared to the display hand-moving operation.

In the meantime, the 'non-display hand-moving operation' of energizing the two coils 88 at the same time is not limited to the configuration where the corresponding operation is performed when swinging the small hand 25 back. For example, the 'non-display hand-moving operation' may be performed when the information display by the small hand 25 is not accompanied, for example when it is intended to release the small hand 25 restrained due to an external shock and the like, when making a backlash, and the like.

As described above, according to this illustrative embodiment, the number of the coils 88 of the stepping motor 65 to be energized at the same time is different upon the display hand-moving operation where the small hand 25 displays the predetermined information and upon the non-display hand-moving operation where the small hand 25 does not display the predetermined information.

For this reason, it is possible to favorably move the small hand 25 by swinging the small hand 25 back at a rapid speed at which a viewer cannot recognize the same or by applying high torque to the restrained small hand 25 to release the restraint.

Also, it is possible to rotate the rotor 7 with high torque in any direction of the forward and reverse directions just by increasing the number of the coils 88 to be energized.

For this reason, it is possible to favorably move the small hand 25 with a simpler structure, as compared to the mechanical structure where a plurality of cams, a spring and the like are combined.

Also, according to the stepping motor 65, the two coil cores 86a, 86b arranged in the vicinity of the peripheral edge portion of the module 3 and extending from the central coupling portion 87 are bent with each other about the central coupling portion 87 at the predetermined angle following the curved shape of the peripheral edge portion of the module 3.

For this reason, it is possible to arrange the two coil cores 86a, 86b, and further the two coil blocks 89 in the vicinity of the peripheral edge portion so that they follow the peripheral edge portion of the module 3. Therefore, it is possible to easily implement the arrangement layout in the module 3 where the hand-moving mechanisms 41 to 43 corresponding to the second hand 21, the minute hand 22 and the hour hand 23 are arranged in the vicinity of the central portion in the module 3.

At this time, if the two coil cores 86a, 86b are bent to follow the peripheral edge portion of the module 3, the coils 88 are wound with being biased toward the coil cores 86a, 86b, so that the number of turns is resultantly reduced. In this illustrative embodiment, since the two coil cores 86a, 86b are linearly formed and are also bent with each other, it is possible to arrange the two coil blocks 89 in the vicinity of the peripheral edge portion in the module 3 without causing the decrease in the number of turns.

Also, the stepping motor 65 has the coil substrates 91, to which both ends of the coils 88 wound onto the respective coil cores 86a, 86b are connected, at the sides closer to the respective tips than the two coil cores 86a, 86b arranged in the vicinity of the peripheral edge portion in the module 3 and extending from the central coupling portion 87. In the stepping motor 65, the parts of the coil substrates 91, to which both ends of the coils 88 are connected, are covered with the protective resins 93, and the circuit substrate 37 having the notches 37a formed, which open towards the outer periphery of the module 3 while avoiding the protective resins, and the coil substrate 91 are surface-contacted each other.

That is, the coil substrates 91 are provided at both ends of the two coil cores 86a, 86b, so that it is possible to favorably surface-contact the coil substrates 91 and the circuit substrate 37 while avoiding the protective resins 93 by the notches 37a opening toward the outer periphery of the module 3.

In contrast, if the coil substrate 91 is provided at the coupling portion 87 between the two coil cores 86a, 86b, the coil substrate 91 on the coupling portion 87 is covered with the protective resin 93. In this case, since it is necessary to enable a wiring pattern to pass a part of the circuit substrate 37 connected to the coil substrate 91, a shape for avoiding the protective resin 93 is not the notch formed toward the outer periphery but is a hole portion in which a wiring pattern part of the circuit substrate 37 exists at the outer periphery-side. Further, a part of the circuit substrate 37 positioned at an outermore periphery than the hole portion is necessarily formed to have a predetermined width or greater from a standpoint of the shock resistance. That is, since the circuit substrate 37 protrudes towards the outer periphery by a distance corresponding to the width, the stepping motor 65 should be arranged at an inner periphery-side of the module 3 so as to avoid the interference between the circuit substrate 37 and the module 3.

Therefore, in this illustrative embodiment, the coil substrates 91 are provided at both ends of the two coil cores 86a, 86b, so that it is possible to arrange the stepping motor 65 in the vicinity of the peripheral edge portion of the module 3 and to easily implement the arrangement layout in the module 3, differently from the configuration where the coil substrate 91 is provided between the two coil cores 86a, 86b.

Figure 9A:
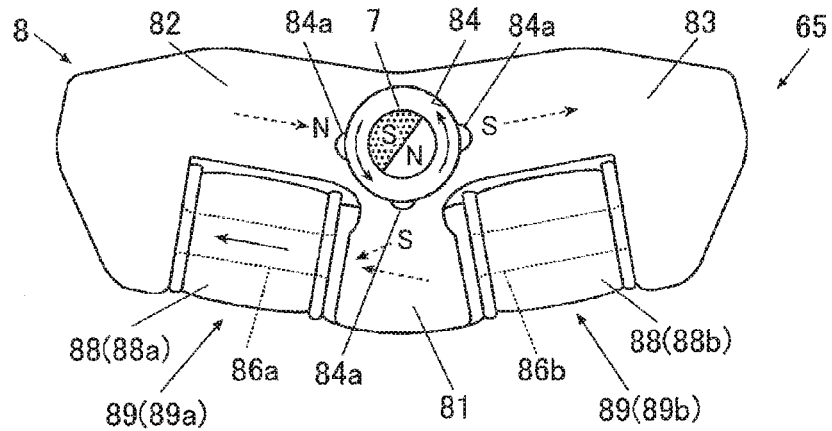
FIGS. 9A to 9C depict a modified embodiment when reversing the rotor of the stepping motor.
Figure 9B:
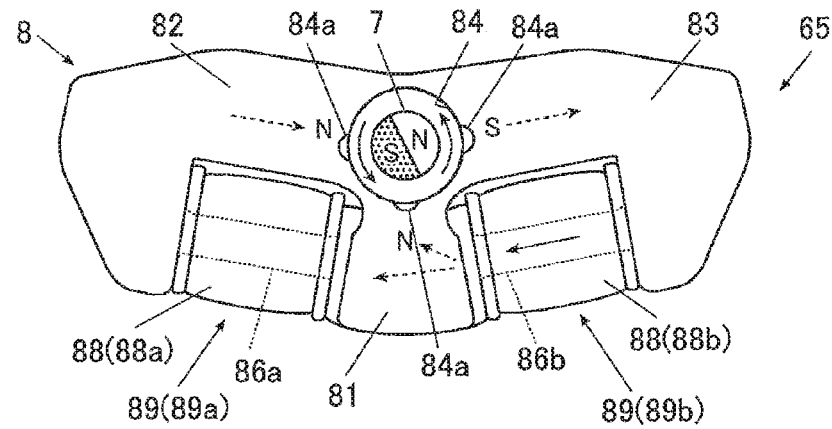
Figure 9C:
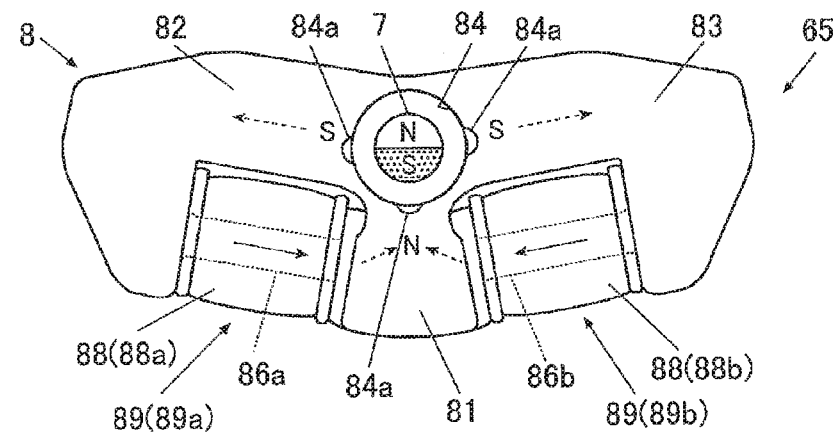

In the above illustrative embodiment, the non-display hand-moving operation where both the two coils 88 are energized to rapidly rotate the small hand 25 in the reverse direction (the counterclockwise direction) and to thus swing the small hand 25 back to the base point (left end) of the rotation range without displaying the information has been described. However, as shown in FIGS. 9A to 9C, the number of the coils 88 to be energized may be a combination of two and one. Also in this configuration, it is possible to swing the small hand 25 back in a much shorter time, as compared to the display hand-moving operation where the number of the coils to be energized at the same time is one.

The illustrative embodiment to which the disclosure can be applied is not limited to the above illustrative embodiment, and can be variously changed without departing from the gist of the disclosure.

For example, in the above illustrative embodiment, the small hand 25 is configured to rotate in the forward rotation direction upon the display hand-moving operation and to rotate in the reverse rotation direction upon the non-display hand-moving operation. However, the relation between the rotation direction of the small hand 25 and the display aspect is not particularly limited, and the rotation direction may be associated with a type of the information that is to be displayed by the small hand 25, too. Accordingly, for example, the display hand-moving operation of displaying the information upon the rotation of the small hand 25 in both the forward and reverse directions may also be performed.

Also, in the above illustrative embodiment, when the rotor 7 of the stepping motor 65 is rotated in the forward rotation direction, the small hand 25 is also rotated in the forward rotation direction. However, the relation between the rotation directions of the rotor 7 and the small hand 25 is not particularly limited inasmuch as they correspond to each other.

Also, in the above illustrative embodiment, the stepping motor 65 has the two coils 88. However, the number of the coils 88 is not particularly limited inasmuch as a plurality of the coils 88 is provided. For example, the number of the coils 88 may be three or more.

Also, in the above illustrative embodiment, the retrograde mechanism including the small hand 25 (the retrograde hand), the wheel train mechanism 55 and the stepping motor 65 is provided for the analog-type timepiece 100. However, the timepiece is not limited to the analog type.

The retrograde mechanism may be provided for a digital-type timepiece having a dial plate (for example, a liquid crystal display unit, and the like) configured to display a variety of information such as time and calendar information by characters and the like or may be provided for a timepiece having two analog-type and digital-type display units.

Although the illustrative embodiments of the disclosure have been described, the scope of the disclosure is not limited to the illustrative embodiments and the disclosure includes the scope defined in the claims and the equivalent scope thereto.

What is claimed is:

1. A hand-moving mechanism configured to move a hand, the hand-moving mechanism comprising:
    a stepping motor that includes a plurality of coils and that rotates a rotational shaft thereof in forward and reverse directions; and
    a wheel train mechanism that includes a plurality of gears comprising:
        one gear which is coupled to the rotational shaft of the stepping motor; and
        another gear which is coupled to the hand,
    wherein the stepping motor includes two coil cores which are arranged in a vicinity of a peripheral edge portion in a module having a bent peripheral edge portion, each of the two coil cores having a linear shape and extending from a central coupling portion,
    wherein each of the two coil cores is formed to be bent at a predetermined angle following a bent shape of the peripheral edge portion of the module, so as to sandwich the central coupling portion between the two coil cores, wherein the hand-moving mechanism further comprises coil substrates that are arranged at sides closer to respective end portions than the two coil cores, wherein both ends of coils wound onto the respective coil cores are connected to the coil substrates, wherein portions where both ends of the coils are connected to the coil substrates are covered with protective resins, wherein the coil substrates and a circuit substrate have a surface contact with each other, wherein the circuit substrate includes notches which open towards an outer periphery of the module while avoiding an overlap with the protective resins, and wherein the protective resins are provided only at portions where the notches are formed on the circuit substrate.

2. The hand-moving mechanism according to claim 1, further comprising:

a motor driving control unit that individually controls energization to each coil to drive the stepping motor, wherein a number of the coils to be simultaneously energized in a display hand-moving operation is different from a number of the coils to be simultaneously energized in a non-display hand-moving operation.

3. The hand-moving mechanism according to claim 2, wherein the stepping motor has two coils, wherein the motor driving control unit energizes only one coil to rotate the hand in one direction in the display hand-moving operation, and wherein the motor driving control unit energizes the two coils to rotate the hand in the other direction in the non-display hand-moving operation.

4. A timepiece comprising the hand-moving mechanism according to claim 3.

5. A timepiece comprising the hand-moving mechanism according to claim 2.

6. The hand-moving mechanism according to claim 1, further comprising:

a motor driving control unit that individually controls energization to each coil to drive the stepping motor, wherein the stepping motor has two coils, wherein the motor driving control unit energizes only one coil to rotate the hand in one direction in a display hand-moving operation, and wherein the motor driving control unit energizes the two coils to rotate the hand in the other direction in a non-display hand-moving operation.

7. A timepiece comprising the hand-moving mechanism according to claim 6.

8. A timepiece comprising the hand-moving mechanism according to claim 1.

* * * * *